Jan. 2, 1934.  H. M. BLINN ET AL  1,942,132
FLUID FLOW CONTROL
Filed June 13, 1929   2 Sheets-Sheet 2
FIG. II.
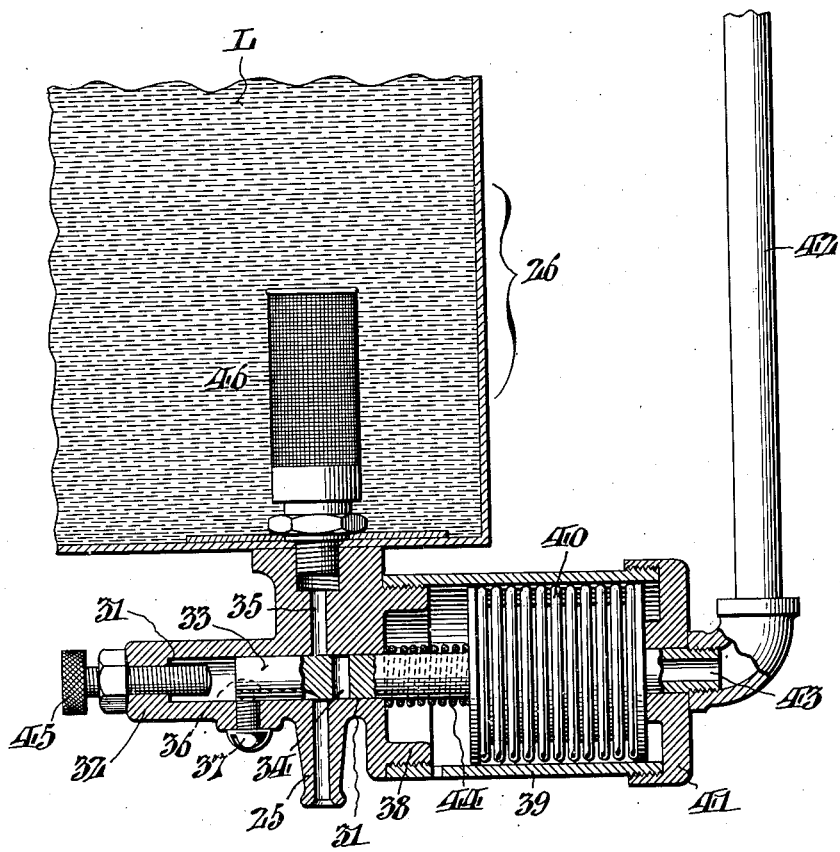
FIG. III.
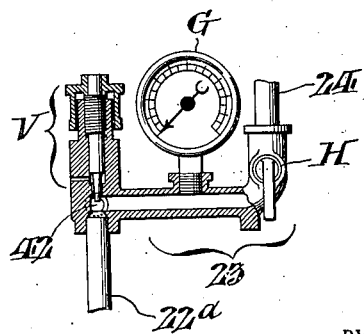
INVENTORS:
Harry M. Blinn &
Herbert T. Hunter,
BY
ATTORNEYS.

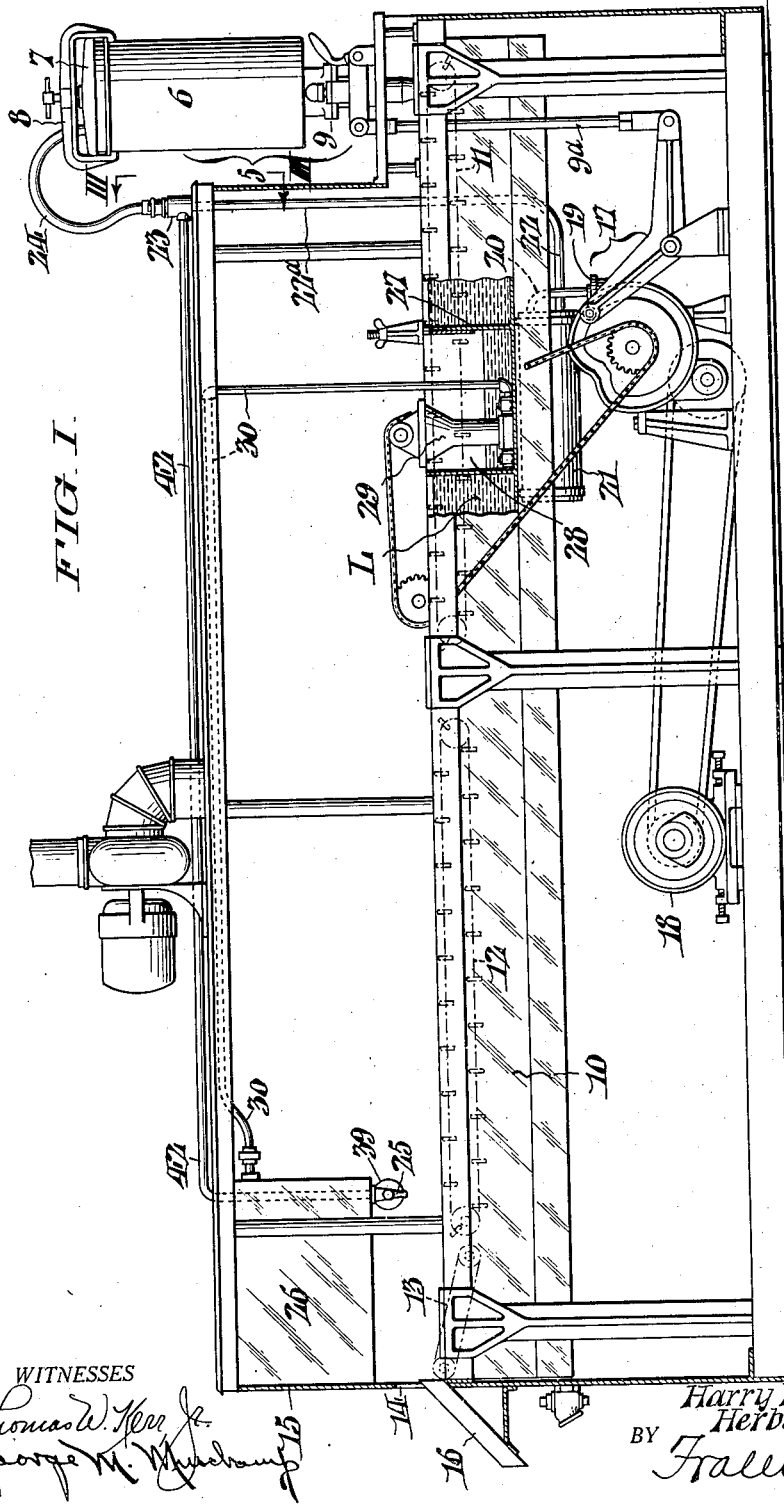

Patented Jan. 2, 1934

1,942,132

UNITED STATES PATENT OFFICE 1,942,132

FLUID FLOW CONTROL

Harry M. Blinn, Baltimore, and Herbert T. Hunter, Catonsville, Md., assignors to Doughnut Machine Corporation, New York, N. Y., a corporation of New York Application June 13, 1929. Serial No. 370,555

2 Claims. (Cl. 53—7)

This invention relates to means for automatically governing the flow of fluids; and has for its main object the provision of means whereby such governance may be accomplished pneumatically.

For convenience we have herein described our invention in a form adapted for use with doughnut machines of the type disclosed in a copending application Serial No. 311,609, filed by Herbert T. Hunter (one of the present applicants) on October 10, 1928, although as will be understood, it may be employed in other connections where similar conditions of operation obtain. As described in the application referred to, the raw formations are produced by expulsion of dough under air pressure through suitable die openings of a dough magazine, and released to drop into a receptacle containing hot liquor in which they are progressed afloat throughout the cooking period, absorption of the liquor by the doughnuts as well as evaporation incident to cooking being compensated for by continuous replenishment from a reserve supply reservoir. Heretofore the flow from the reserve supply reservoir had to be shut off manually during periods of cessation in the operation of the machines; and forgetfulness on the part of the attendants to do this often resulted in flooding of the cooking receptacles through after-flow from the reserve supply. One of the aims of our invention, in connection with the recited instance of specific application, is to preclude contingencies such as pointed out by providing for automatic shutting-off of the flow from the reserve supply concurrently with decrease or failure of the air pressure.

Other objects and attendant advantages of this invention will appear in the course of the following description which refers to the attached drawings, wherein Fig. I is a fragmentary illustration in longitudinal section of a doughnut machine equipped with our novel fluid flow control.

Fig. II is a fragmentary sectional view, on a larger scale showing the details of the flow control; and, Fig. III is a fragmentary illustration, viewed as indicated by the arrows III—III in Fig. I.

In the doughnut machine illustrated in Fig. I for the purposes of exemplifying one practical use of our invention, the raw doughnuts are produced by a forming means 5 which comprises a dough magazine 6 with a removable top cover 7 held in place fluid tight by a screw clamp yoke 8, and outlet die means 9 through which the dough is expelled by compressed air from the magazine 6. The raw doughnuts released by the die mechanism 9 drop into one end of an elongated cooking receptacle 10 which is filled with cooking liquor L to the level indicated, said liquor being heated by suitable means not shown. The doughnuts are progressed in the receptacle 10 afloat in the liquor L by endless conveyors 11, 12 and finally lifted out of said liquor at the opposite end of the receptacle by an elevator 13 for discharge through an opening 14 in the casing 15 of the machine onto a delivery chute 16. The die means 9 is intermittently operated through a coupling connection 9a, by a transmission mechanism 17 located within the casing 15 beneath the receptacle 10, said transmission being belt driven by an electric motor 18. The system relied upon for supplying compressed air to the dough magazine 6 of the forming means 5 comprises a pump 19 associated with the transmission mechanism 17, said pump delivering through a pipe 20 into a pressure equalizing tank 21 wherefrom the compressed air is conducted via another pipe 22 with a vertical branch 22a which terminates in a fitting 23 at the top of the machine casing 15. As shown in Fig. III, this fitting 23 affords connection for a bleed valve V having capacity for adjustment to maintain a predetermined pressure in the air system; a sight gage G; a hand cock H as well as for a flexible tube 24 that extends to a coupling nipple on the lid 7 of the dough magazine 6. As the doughnuts are progressed in the receptacle 10, they are cooked first on one side and then on the other and incidentally absorb considerable cooking liquor L. The quantity thus absorbed and that lost through evaporation are compensated for by a continuous discharge of liquor L from the outlet fitting 25 of a reserve supply tank 26 located at the left hand end of the machine. The level of the liquor L in the cooking receptacle 10 is maintained constant by a vertically adjustable dam 27 which forms one wall of a well 28 at one side of said receptacle. The overflow collected in the well 28 is drawn off by means of a pump 29 driven through a sprocket chain by the transmission mechanism 17, and the accumulation conducted to the reserve supply reservoir 26 through a pipe line 30.

In adapting our novel fluid flow control to a machine of the type briefly described, we form the outlet fitting 25 of the reserve supply reservoir 26 (Fig. II) with a horizontal bore 31 that is prolonged through a lateral boss 32 of the fitting. This bore 31 is occupied by a plunger 33 with a transverse port 34 adapted to be moved into and out of registry with the flow duct 35. To prevent its rotation, the plunger 33 is longitudinally grooved as at 36 for engagement by a screw 37 taking into the side of the boss 32. Diametrically opposite the boss 32, the outlet fitting 25 has a threaded neck 38 for attachment of a cylinder 39 to house a sylphon bellows 40, said cylinder being closed by a screw cap 41. The sylphon bellows 40 is in communication with the fitting 23 of the compressed air system through a pipe line 42 that connects with a threaded nipple 43 on the closure cap 41. The movement of the sylphon bellows 40 is resisted by a helical compression spring 44, and limited by an adjustable stop screw 45 threaded axially into the end of the boss 32. The upper end of the flow bore 35 through the outlet fitting 25 of the reserve supply reservoir 26 is protected by a cylindric screen 46 which serves to intercept any solid matter carried along by the liquor L pumped into said reservoir from the cooking receptacle 10.

The operation of our invention is as follows: Normally, with the dough magazine 6 of the forming means 5 closed to maintain the pressure in the air system, the sylphon bellows 40 is expanded, and the plunger 33 consequently held in the forward position against the stop screw 45 with its port 34 in registry with the flow duct 35 through the fitting 25, so that cooking liquor L is permitted to drain continuously into the receptacle 10 for the purpose hereinbefore explained. When, however, upon exhaustion of the dough in the magazine 6, the cover 7 of the latter is removed in preparation for refilling, or when the machine is stopped entirely, with attendant dissipation of the air pressure, the sylphon bellows 40 is contracted by the spring 44 and the plunger 33 retracted, as shown in Fig. II, to automatically shut off further flow of cooking liquor L from the reserve supply reservoir 26. Thus under the conditions noted, the flow control of our invention operates as a reliable automatic means to prevent flooding of the cooking receptacle 10 with the liquor L as often happened heretofore through after discharge from the auxiliary or reserve supply reservoir. It is to be noted that the flow from the reserve supply reservoir 26 is regulatable by adjusting the screw 45 to vary the limit of plunger movement toward the left (Fig. II) and the extent of register as between the port 34 and the flow duct 35 through the fitting 25.

Although we have herein shown and described our invention in association with a doughnut machine, as already pointed out, it is obvious that the same may be employed with equal advantages in other connections where it is desirable or necessary to control the flow of liquids pneumatically. We therefore do not wish to be limited to the specific construction and arrangement herein disclosed.

Having thus described our invention, we claim:

1. In a machine for cooking doughnuts and the like in hot liquor, a receptacle for the liquor; means including a dough magazine and die mechanism to form the raw doughnuts and to release them to drop into the receptacle; a system for supplying compressed air to the magazine of the forming means to effect extrusion of the dough through the die mechanism; a reservoir containing a reserve supply of cooking liquor and having a regulatable valve to normally control discharge of the reserve liquor into the cooking receptacle at a rate to compensate for absorption in the cooking; and means automatically operative upon depletion of the dough and attendant fall of the air pressure in the dough magazine to close the valve of the reserve liquor supply reservoir.

2. In a machine for cooking doughnuts and the like in hot liquor, a receptacle for the liquor; means including a dough magazine and die mechanism to form the raw doughnuts and to release them to drop into the receptacle; a system to supply compressed air to the magazine of the forming means to effect extrusion of the dough through the die mechanism; a reservoir containing a reserve supply of cooking liquor and having a regulatable valve for normally controlling discharge of the reserve liquor into the cooking receptacle at a rate to compensate for absorption in the cooking; and pneumatically responsive means associated with the valve and connected with the compressed air system aforesaid, whereby, upon depletion of the dough and attendant fall of the pressure in the dough magazine of the forming means, said valve is closed to prevent further discharge of liquor from the reserve supply reservoir.

HARRY M. BLINN.
HERBERT T. HUNTER.